(12) United States Patent
Bertolini et al.

(10) Patent No.: US 7,821,173 B2
(45) Date of Patent: Oct. 26, 2010

(54) BELL-ARMATURE COIL

(75) Inventors: Thomas Bertolini, Rheinau (DE); Roland Keller, Starzach-Felldorf (DE); Roland Brugger, Altdorf (DE); Roland Kirchner, Schönaich (DE); Hubert Renner, Grafenau-Döffingen (DE); Helmut Wagner, Schönaich (DE)

(73) Assignee: Dr. Fritz Faulhaber GmbH & Co. KG, Schonaich (DE)

( * ) Notice: Subject to any disclaimer, the term of this patent is extended or adjusted under 35 U.S.C. 154(b) by 398 days.

(21) Appl. No.: 11/803,042

(22) Filed: May 11, 2007

(65) Prior Publication Data

US 2007/0262673 A1 Nov. 15, 2007

(30) Foreign Application Priority Data

May 11, 2006 (DE) ............... 20 2006 007 619 U

(51) Int. Cl.
*H02K 23/26* (2006.01)
*H02K 23/58* (2006.01)

(52) U.S. Cl. ............... 310/216.002; 310/194; 310/216.003; 310/270; 310/71

(58) Field of Classification Search ........... 310/179, 310/266, 71; *H02K 3/51, 23/26, 23/58; B06B 1/04*
See application file for complete search history.

(56) References Cited

U.S. PATENT DOCUMENTS

| 4,286,375 A | 9/1981 | Nakamura et al. |
| 4,329,610 A * | 5/1982 | Klein .................... 310/220 |
| 4,859,890 A * | 8/1989 | Sedgewick ............... 310/208 |
| 5,394,046 A * | 2/1995 | Dolgas ............... 310/216.002 |
| 5,668,429 A * | 9/1997 | Boyd et al. .................. 310/254 |
| 6,538,403 B2 * | 3/2003 | Gorti et al. ............. 318/400.11 |
| 7,042,122 B1 * | 5/2006 | Dufala et al. .............. 310/68 R |
| 2003/0071534 A1 * | 4/2003 | Kreuzer et al. .............. 310/216 |
| 2006/0108886 A1 * | 5/2006 | Kehr et al. .................. 310/103 |
| 2007/0296292 A1 * | 12/2007 | Kienzler et al. ............... 310/71 |

FOREIGN PATENT DOCUMENTS

| DE | 40 21 256 | 1/1992 |
| GB | 1 598 165 | 9/1981 |
| JP | 54-61608 | 5/1979 |
| JP | 55-160957 | 12/1980 |
| JP | 10-150757 | 6/1998 |
| JP | 2002-64966 | 2/2002 |
| JP | 200448883 * | 2/2004 |
| WO | WO2004/062066 A1 * | 7/2004 |

OTHER PUBLICATIONS

DC Motoren: Die Technologie der Motoren mit eisenlosem Rotor.

* cited by examiner

*Primary Examiner*—Quyen Leung
*Assistant Examiner*—Terrance Kenerly
(74) *Attorney, Agent, or Firm*—Brinks Hofer Gilson & Lione

(57) ABSTRACT

In at least one embodiment of the present invention a bell-armature coil for an electric motor is provided. The bell-armature coil comprises a hollow-cylindrical coil winding which forms a coil opening at one end and is wound from a winding wire. The bell-armature coil further comprises a coil former plate. The coil former plate includes a printed circuit board. Into the coil opening the coil former plate is inserted. The coil winding has conductor ends which are connected to the printed circuit board.

10 Claims, 4 Drawing Sheets

BELL-ARMATURE COIL

CROSS REFERENCE TO RELATED APPLICATION

This application claims priority to DE Patent Application No. 202006007619.0 filed May 11, 2006.

FIELD OF THE INVENTION

The present invention relates to a bell-armature coil comprising a hollow-cylindrical coil winding, which is wound from a winding wire and into whose coil opening a coil former plate is inserted at one end. Such bell-armature coils may be used in particular in DC motors having an ironless rotor.

BACKGROUND

There are various winding methods for winding the bell-armature coil, which are as follows.

The first winding method provides for part of the winding to be wound on a sleeve or a rod with stove-enamel wire. The wire is then fixed by means of being heated, by applying so-called intermediate baking, and then further part-windings are wound and subjected to intermediate baking until the coil has been completely wound. The final shaping of the coil takes place by applying so-called final baking. The wire ends then still need to be prepared for the contact-making and connection.

Another method consists in the entire winding being wound onto a rod. The winding has circumference finely distributed pins that are fitted at both ends. The pins fix the winding during the process. The entire winding can therefore be wound continuously without intermediate baking being required. Then, the finely distributed pins are removed, the basic coil is withdrawn, the final baking takes place and the connections are prepared for the contact-making and connection.

Another method consists in a longitudinal coil being wound which has a quadrilateral or hexagonal cross-section. This wound longitudinal coil is then pressed flat and the pressed-flat coil is rolled together to form a cylindrical coil. Then, the final baking takes place and the connections are prepared and contact is made.

In the case of the bell-armature motors in the embodiment as DC commutator motors with a rotating bell armature, the commutator also needs to be attached to the coil and fixed. In embodiments with a fixed coil, electronically commutated motors, contact needs to be made and often Hall sensors need to be fitted and aligned.

SUMMARY OF THE INVENTION

In at least one embodiment, the present invention provides a design of the bell-armature coil such that it can be produced rapidly with a continuous method and with few intermediate steps.

This may be achieved, according to the invention, by a coil former plate being in the form of a printed circuit board to which the coil winding is connected with its conductor ends. In this case, it is particularly advantageous if the printed circuit board is in the form of a winding aid with winding projections arranged on the circumference about which winding projections the winding wire is guided so as to form the coil winding. The coil winding is preferably in the form of a skewed winding. In particular, the coil winding may be produced as a continuous winding. The embodiment according to the invention makes a continuous method possible in which no additional handling is required during contact-making since the contacts have already been formed on the printed circuit board in predetermined positions. Likewise, additional handling is not required for fitting the pre-assembled Hall sensors. In addition, an improvement to the baking process is made possible since electrical heating of the coil from the inside is possible and there is therefore less risk of causing any mechanical damage during pressing.

In this case, the bell-armature coil, which is in particular in the form of a self-supporting cylindrical coil having a skewed winding, forms the active part of the rotor. It is characterized by a very low moment of inertia. Owing to the lack of iron armature, there are no iron losses and no magnetic cogging torque. The rotor stops in any desired position, and the speed is only dependent on the supply voltage and the load torque. The stator appropriate for this expediently comprises a two-pole magnet, and the housing forms the magnetic yoke. The mechanical commutator can also be formed on the former plate, which is in the form of a motor winding support or coil former.

In at least one embodiment of the present invention, the winding process is considerably simplified by the printed circuit board which is used in the form of a so-called "lost winding aid" (the printed circuit board is also wound during the winding process). Owing to the fact that the printed circuit board is already wound, the position of conductor connections and of Hall sensors, which may be required, is clearly prescribed. Furthermore, the design according to the invention makes it possible for a shaft with the commutator to be capable of being positioned on the printed circuit board as a rotor for a DC commutator motor. In addition, the entire coil may be extrusion-coated with plastic for mechanical robustness.

Overall, a shorter processing time with fewer working steps may be achieved by the invention, as a result of which an increase in quality and a reduction in costs may also be achieved.

BRIEF DESCRIPTION OF THE DRAWINGS

The invention will be explained in more detail with reference to the exemplary embodiment illustrated in the attached drawings, in which.

Further objects, features and advantages of the invention will become apparent from consideration of the following description and the appended claims when taken in connection with the accompanying drawings.

DETAILED DESCRIPTION OF THE INVENTION

Figure 1:
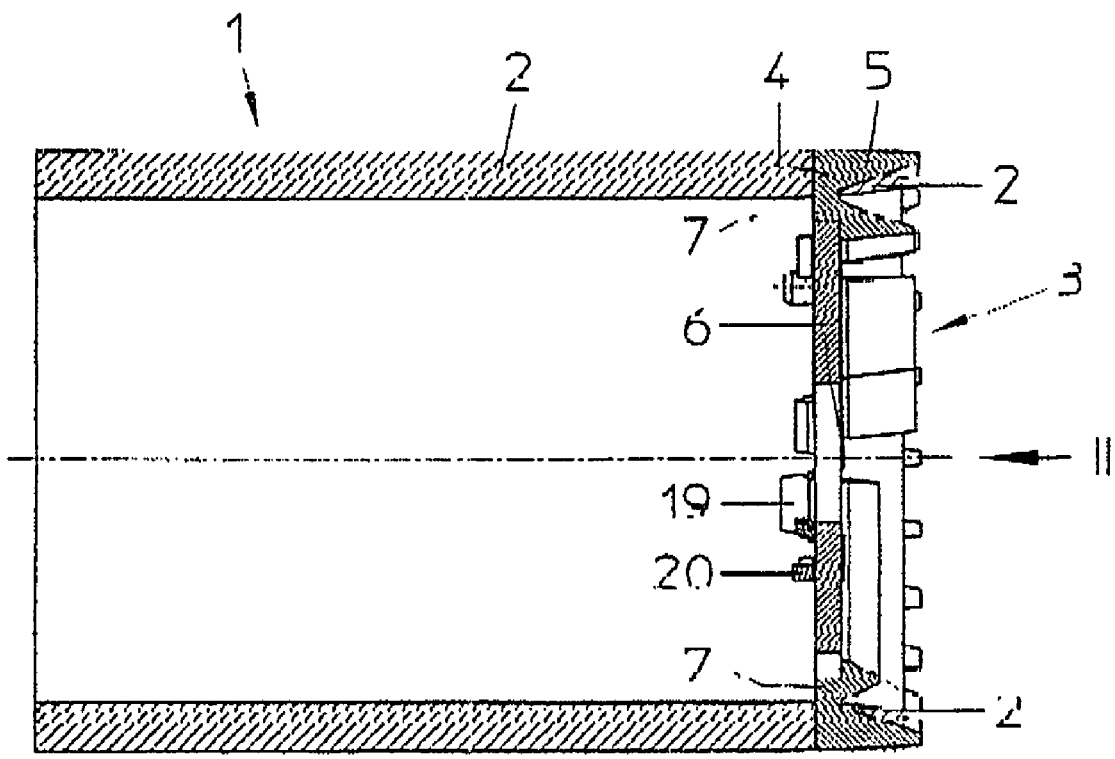
FIG. 1 is a longitudinal section view through a bell-armature coil in accordance with an embodiment of the present invention.
Figure 2:
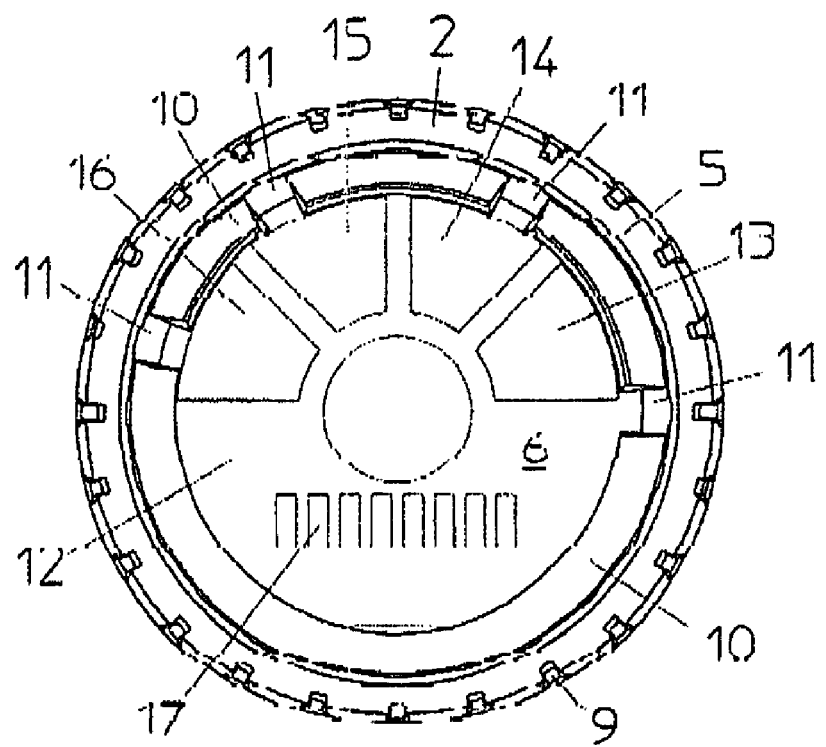
FIG. 2 is a view of the bell-armature coil depicted in FIG. 1 corresponding to the arrow 11.

Referring to FIG. 1, a bell-armature coil 1 according to at least one embodiment of the present invention is provided.

The bell-armature coil 1 comprises a hollow-cylindrical coil winding 2, which is wound from a winding wire and in whose coil opening a coil former is arranged at one end, which coil former is in the form of a printed circuit board 3. The coil winding 2 with its conductor ends is connected to this printed circuit board 3. The coil winding 2 is preferably in the form of a skewed winding. The winding wire of the coil winding is preferably produced as a stove-enamel wire, with the result that it is possible for the coil winding to be baked once it has been produced.

The printed circuit board 3 may be produced in the form of a winding aid with projections 4 arranged on the circumference. The winding wire can be wound around the projections 4 so as to form the coil winding 2. The coil winding 2 can be wound continuously without intermediate baking being required. Once winding of the coil winding 2 is complete, the printed circuit board 3 remains, as the coil former, in the coil, which has been completely wound and is fixed by means of the final baking.

Contact can be made with the coil ends directly at the integrated printed circuit board 3. In the exemplary embodiment illustrated, the printed circuit board 3 is designed in two parts. It comprises an outer plastic ring 5 and a printed circuit board disk 6, which has been inserted into this plastic ring 5. The printed circuit board disk 6 can be clipped or adhesively bonded into the plastic ring 5. The plastic ring 5 comprises a ring part 7, on which radially running radial protrusions 8 and, at the ends of the said radial protrusions 8, axially pointing hook protrusions 9 are formed. This can be seen from FIG. 3, which shows the two-part printed circuit board 3. As can be seen from FIG. 1, the coil winding 2 is wound around the hook-shaped protrusions 9 until the coil former is formed. The hook-shaped protrusions 9 form with their rear side facing the coil former, together with the radial protrusions 8, a stop face for the coil ring former. The ring part 7 has an axially and outwardly pointing circumferential ring web 10, which is arranged concentrically with respect to the hook-shaped protrusions 9. The winding space for accommodating the coil winding surrounding the hook-shaped protrusions 9 is located between the ring web 10 and the hook-shaped protrusions 9. Apertures 11, through which the winding wire sections which connect the individual coil winding sections run, are located in the ring web 10.

Figure 3:
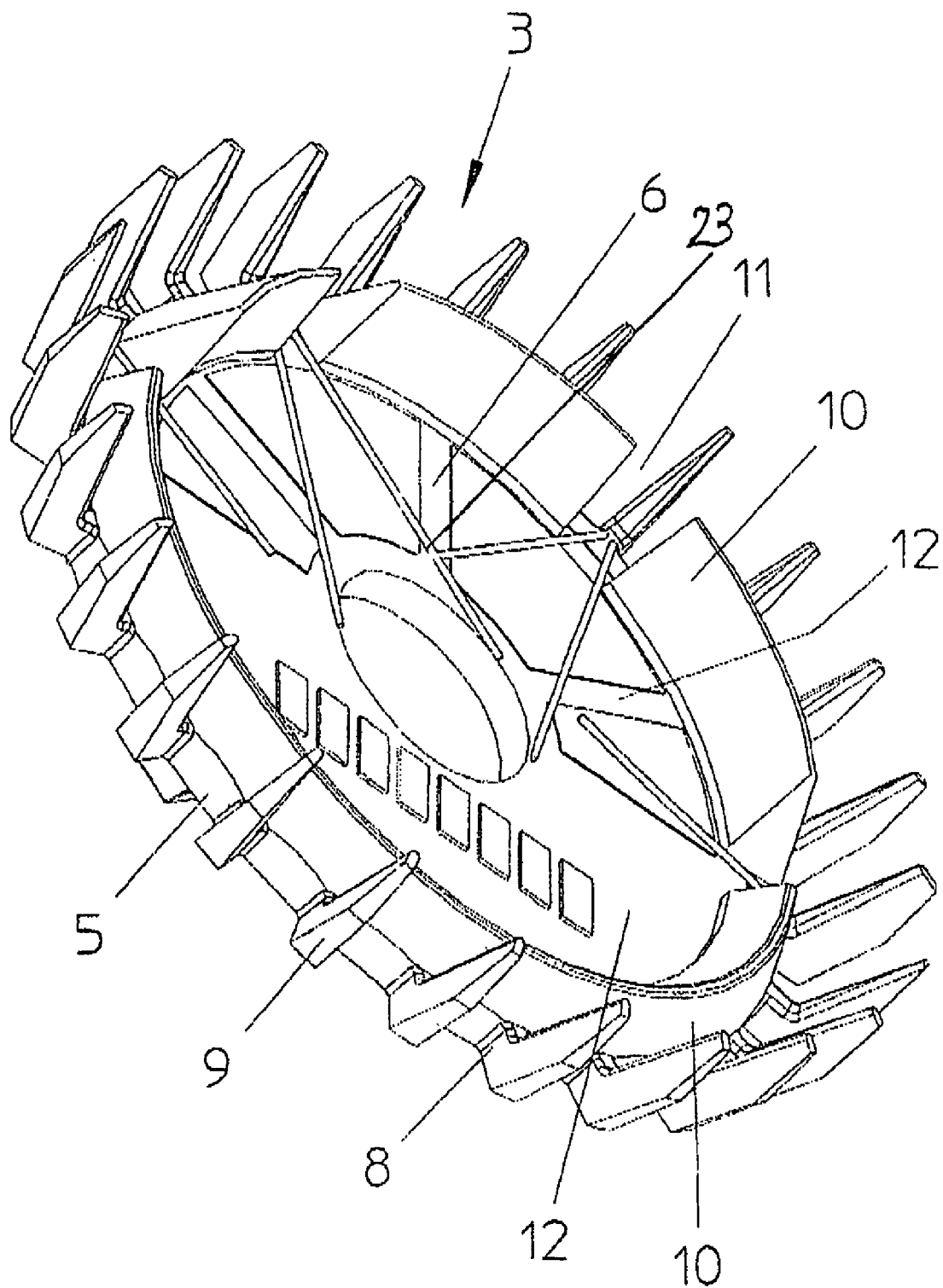
FIG. 3 is a perspective view of a printed circuit board in accordance with an embodiment of the present invention.
Figure 7:
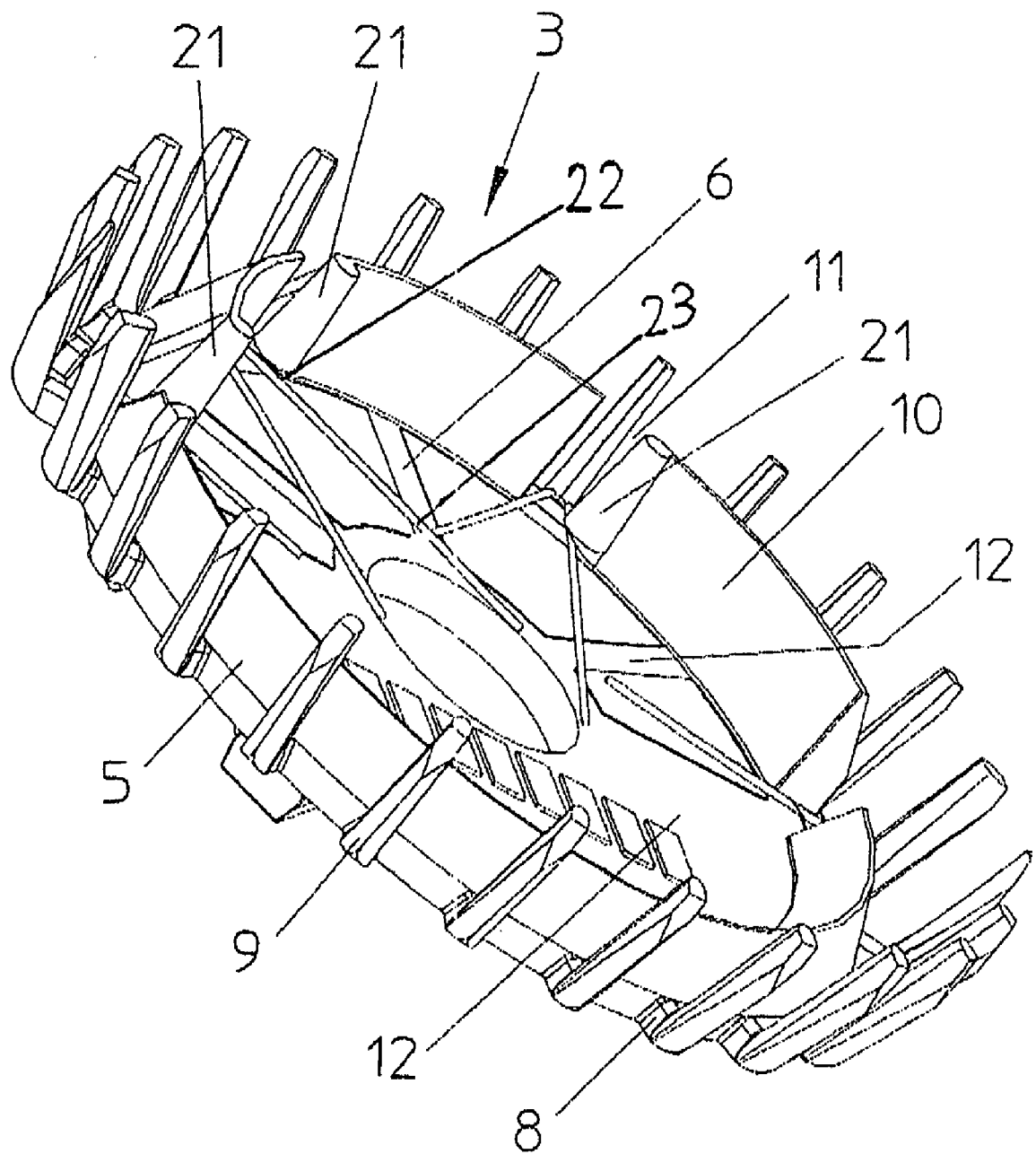
FIG. 7 is a perspective view of a printed circuit board in accordance with an embodiment of the present invention.

As is shown in FIG. 7, in which identical parts to those in FIG. 3 are provided with the same reference symbols, a wire-clamping apparatus 21 can be provided on one side at the edge of the apertures 11. This wire-clamping apparatus 21 comprises a thickened edge portion in the form of a truncated cone, which forms a slit 22 on its underside. The winding wire 23 is passed in clamping fashion by the slit.

Figure 4:
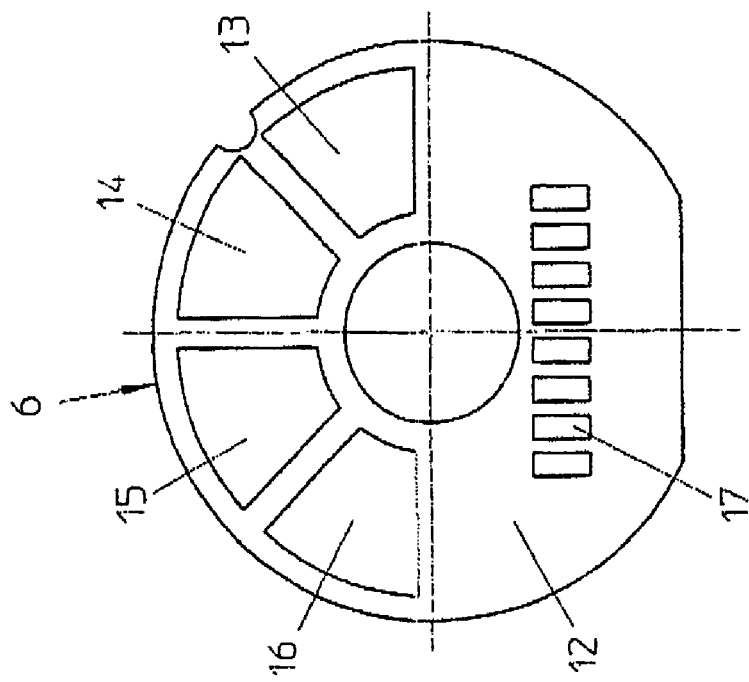
FIG. 4 is a front view of a printed circuit board in accordance with an embodiment of the present invention.
Figure 6:
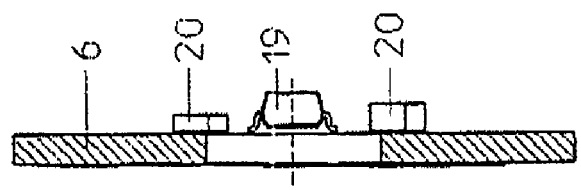
FIG. 6 is a side view of the printed circuit board depicted in FIG. 4.
Figure 5:
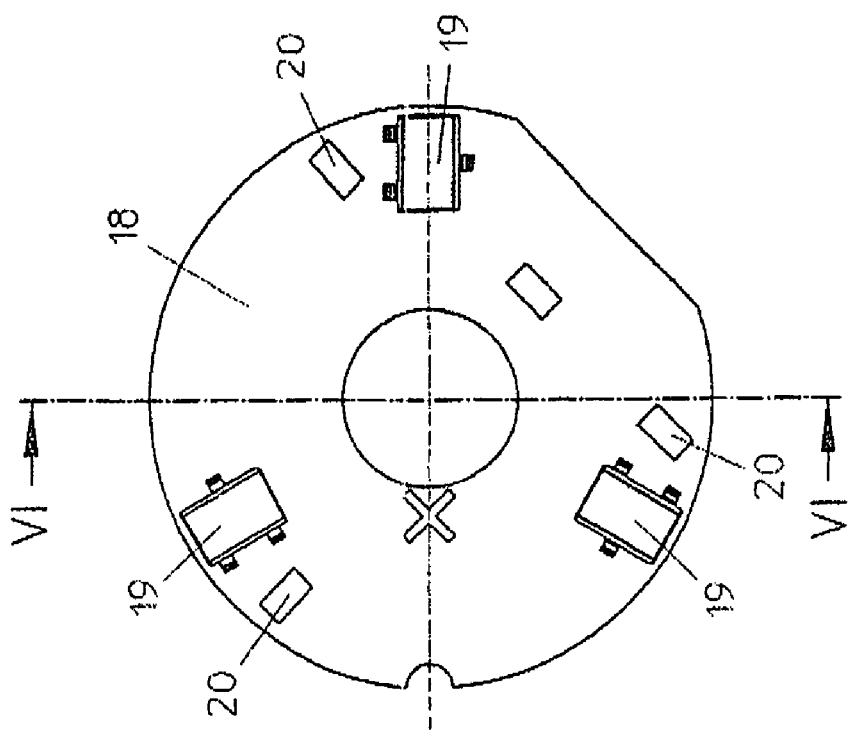
FIG. 5 is a rear view of the printed circuit board depicted in FIG. 4.

As can be seen in FIGS. 4 to 6, for example, the printed circuit board disk 6 has, on its outer front side 12, patch edge panels 13, 14, 15, 16 in the form of circle segments for connecting the ends of three winding sections, the two outer edge panels 13 and 16 serving the purpose of connecting the start and the end of the same winding section. Furthermore, contact pads 17 for the conductors of a flat ribbon cable are located beneath the upper panels, preferably in a row. The printed circuit board disk 6 has, for example, Hall sensors 19 on its inner rear side 18, with the pull-up resistors 20 required for said Hall sensors 19. It is also possible for further components to be fitted in particular on the rear side 18.

In at least one embodiment, the printed circuit board 3 may be integral. In this case, slots are provided around the circumference on the printed circuit board 3, between which slots in each case winding protrusions are located around which the coil winding 2 is wound.

Furthermore, it is likewise possible according to the invention to position a commutator with a shaft on the printed circuit board 3 if the bell-armature coil is to be used, for example, as a rotor for a DC commutator motor.

As a person skilled in the art will readily appreciate, the above description is meant as an illustration of implementation of the principles of this invention. This description is not intended to limit the scope or application of this invention in that the invention is susceptible to modification, variation and change, without departing from the spirit of the invention, as defined in the following claims.

The invention claimed is:

1. A bell-armature coil for an electric motor, the bell-armature coil comprising:
   a hollow, self supporting cylindrical coil winding forming a coil opening at one end and which has a skewed winding defining a cylindrical wall of the coil winding that is wound from a winding wire forming a continuous winding; and
   a coil former plate including a printed circuit board, the coil former plate inserted into the coil opening, wherein the coil winding has conductor ends which are connected to the printed circuit board, the coil former plate forms a winding aid that includes winding projections arranged on a circumference of the printed circuit board, the winding wire is wound around each of the winding projections so as to form the coil winding without extending across the printed circuit board, and wherein the bell-armature coil forms an active part of a rotor of the electric motor.

2. The bell-armature coil according to claim 1 wherein the projections on the printed circuit board are formed between slots formed on the circumference of the printed circuit board and at equal distances.

3. The bell-armature coil according to claim 1 wherein the printed circuit board includes an outer plastic ring which includes second winding projections arranged around a circumference of the outer plastic ring and a printed circuit board disk which is inserted in the plastic ring.

4. The bell-armature coil according to claim 3 wherein the winding projections of the printed circuit board include radial protrusions each of which form an axially pointing hook protrusion at a free end of the radial protrusion.

5. The bell-armature coil according to claim 3 wherein the printed circuit board disk is one of clipped in and adhesively bonded to the plastic ring.

6. The bell-armature coil according to claim 1 further comprising Hall sensors in the form of rotary position sensors which are disposed on the printed circuit board.

7. The bell-armature coil according to claim 1 further comprising a mechanical commutator which is disposed concentrically to a coil axis and includes a shaft fixed to the printed circuit board.

8. The bell-armature coil according to claim 1 wherein the winding wire is in the form of stove-enamel wire.

9. The bell-armature coil according to claim 1 wherein the coil winding is extrusion-coated with a plastic layer.

10. The bell-armature coil according to claim 1 wherein the printed circuit board is formed with a wire-clamping apparatus.

\* \* \* \* \*